Jan. 12, 1971 J. BERG ET AL 3,554,014
APPARATUS FOR MEASURING THE THICKNESS OF A WORKPIECE
IN A LIQUID TEMPERATURE COMPENSATION MEANS
Filed Aug. 21, 1969 2 Sheets-Sheet 1

INVENTORS.
JERRY BERG
LAWRENCE E. BAUER, JR.
BY:
Ervin B. Steinberg

INVENTORS.
JERRY BERG
LAWRENCE E. BAUER, JR.

United States Patent Office 3,554,014
Patented Jan. 12, 1971

3,554,014
APPARATUS FOR MEASURING THE THICKNESS OF A WORKPIECE IN A LIQUID TEMPERATURE COMPENSATION MEANS
Jerry Berg, Stamford, and Lawrence E. Bauer, Jr., Springdale, Conn., assignors to Branson Instruments, Inc., Stamford, Conn., a corporation of Delaware
Filed Aug. 21, 1969, Ser. No. 852,034
Int. Cl. G01n 29/00
U.S. Cl. 73—67.8
7 Claims

ABSTRACT OF THE DISCLOSURE

An apparatus and method for measuring the thickness of a workpiece uses a liquid body into which a standard and workpieces to be tested are immersed. A pair of transducers fixed at a distance apart are brought first into acoustic energy transferring contact with opposite sides of a standard immediately thereafter with a workpiece to be tested. During the respective energy transferring contacts pulse-echo ultrasonic energy is used to measure the length of the liquid path between the respective transducers and the standard and the workpiece. An electronic circuit coupled to the transducers provides a value indicative of the thickness of the workpiece, such value being independent of sound velocity changes in the liquid path.

---

This invention refers to ultrasonic thickness measurement and more specifically concerns an apparatus for ultrasonically measuring the thickness of a workpiece immersed in a liquid and including temperature compensation means to compensate for errors caused by changes in the temperature of the liquid.

When testing metal castings or other workpieces for internal integrity it is known to use ultrasonic energy which is propagated through the workpiece. Changes in the velocity of sound transmission from a nominal value can be related to inconsistencies or defects within the workpiece. Typical defects discernible by this method are grain boundaries, flaws, occlusions, variations from acceptable grain size, etc. Since velocity of sound through a material equals distance of sound travel (mechanical thickness) divided by time, it is necessary to measure the thickness of the workpiece with great accuracy.

When testing workpieces which have an irregular surface or when automated production testing is required it is common practice to immerse the workpiece in a liquid, such as water, and use the liquid as a couplant for the ultrasonic energy transmission between the transducer and workpiece. If the workpiece is metal, changes in temperature of the liquid path have a significant effect upon the transmission velocity of sound. Also impurities introduced into the liquid bath by workpieces subjected to production testing steadily change the speed of sound transmission through the liquid.

It has been found necessary, therefore, to provide a means for compensating for contamination and temperature dependent changes in sound velocity of the liquid coupling means whenever workpieces are to be tested with a high degree of accuracy and reliability.

The arrangement described hereafter uses a liquid body into which a standard and workpieces to be tested are immersed. A pair of transducers fixed at a distance apart are brought first into acoustic energy transferring contact with opposite sides of a standard and immediately thereafter with a workpiece to be tested. During the respective energy transferring contacts pulse-echo ultrasonic energy is used to measure the length of the liquid path between the respective transducers and the standard and the workpiece respectively. An electronic circuit coupled to the transducers provides a value indicative of the thickness of the workpiece, such value being independent of sound velocity changes in the liquid path.

One of the principal objects of this invention is the provision of a novel and improved apparatus for measuring the thickness of a workpiece.

Another principal object of this invention is the provision of an apparatus for measuring the thickness of a workpiece which is immersed in a liquid bath by the pulse-echo ultrasonic test method.

A further important object of this invention is the provision of an apparatus for measuring by the ultrasonic pulse-echo method the thickness of a workpiece immersed in a liquid and excluding from the measurement errors and inaccuracies introduced by temperature changes of the liquid and by contamination of the liquid.

A still further object of this invention is the provision of a test method and apparatus for measuring the thickness of workpieces by the pulse-echo ultrasonic test method, each such workpiece being briefly immersed in a liquid bath which provides coupling for the acoustic energy, and each workpiece while being immersed being compared with a standard also immersed in the same bath in order to compensate for changes in the liquid temperature and for changes in the acoustic transmission quality of the liquid due to contaminants.

Further and still other objects of this invention will be more clearly apparent by reference to the following description when taken in conjunction with the accompanying drawing in which.

Figure 1:
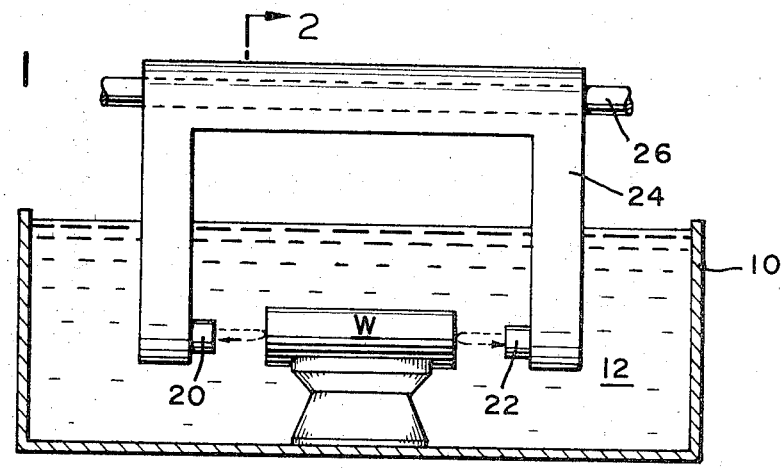
FIG. 1 is a schematic illustration of the mechanical arrangement of the present invention.
Figure 2:
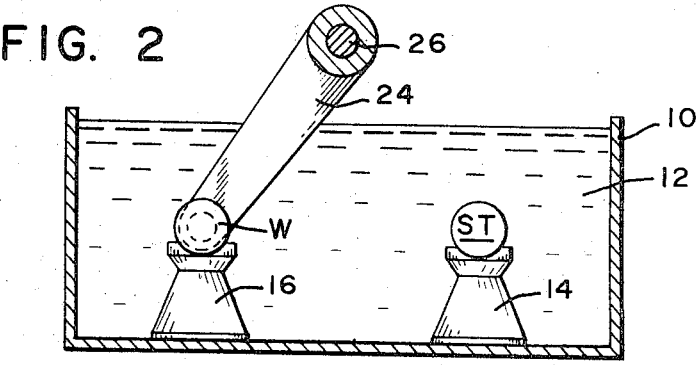
FIG. 2 is a sectional view along line 2—2 of FIG. 1.

Referring now to the figures and FIGS. 1 and 2 in particular, numeral 10 identifies a container filled with a liquid coupling means 12, such as water. Within the container and liquid there is disposed a pair of stationary supports 14 and 16 for supporting respectively a standard ST and a workpiece W whose thickness is to be measured as part of the inegrity determination. A pair of spaced apart transducers 20 and 22 suitable for ultrasonic pulse-echo measurement are mounted to a substantially rigid frame 24 in order to maintain the distance between the transducers constant. The frame 24 is mounted for pivotal motion about a shaft 26. Motive means (not shown) are used to pivot the frame in such a manner that during a first time interval the transducers 20 and 22 are disposed opposite the opposing end surfaces of the standard ST. During this interval these transducers are energized to cyclically send ultrasonic search pulses through the liquid coupling means toward the respective end surface and receive echo signals therefrom, each echo signal being caused by a reflection of the ultrasonic search signal at the respective end surface.

Figure 3:
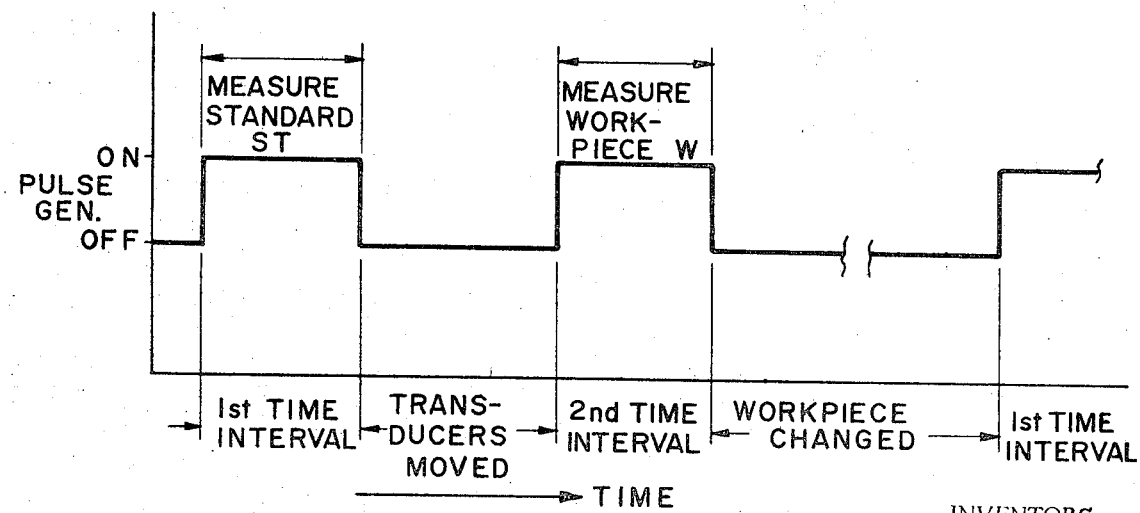
FIG. 3 is a timing diagram.

During an ensuing time interval, the frame 24 is pivoted to cause the transducers to be located in acoustic contact with the end surfaces of the workpiece W, see FIG. 1. Again the transducers are energized to send search signals and receive corresponding echo signals. Thereafter the frame is pivoted back and the transducers are disposed for retesting the standard ST, but before repeating the cycle, the previously tested workpiece is removed and a new workpiece W is placed on the support 16. Then, the transducers are energized to perform the test on the standard and the workpiece as described above. This cycle of events is indicated in FIG. 3. It should be understood that the ON period of the pulse generator may extend over several seconds and that during that time the pulse repetition frequency may be in order of 2,000 to 4,000 cycles per second. Hence, a large quantity of pulse-echo measurements is made during each time interval and the respective measurements are averaged by the measuring circuit described in connection with FIGS. 4 and 5.

Figure 4:
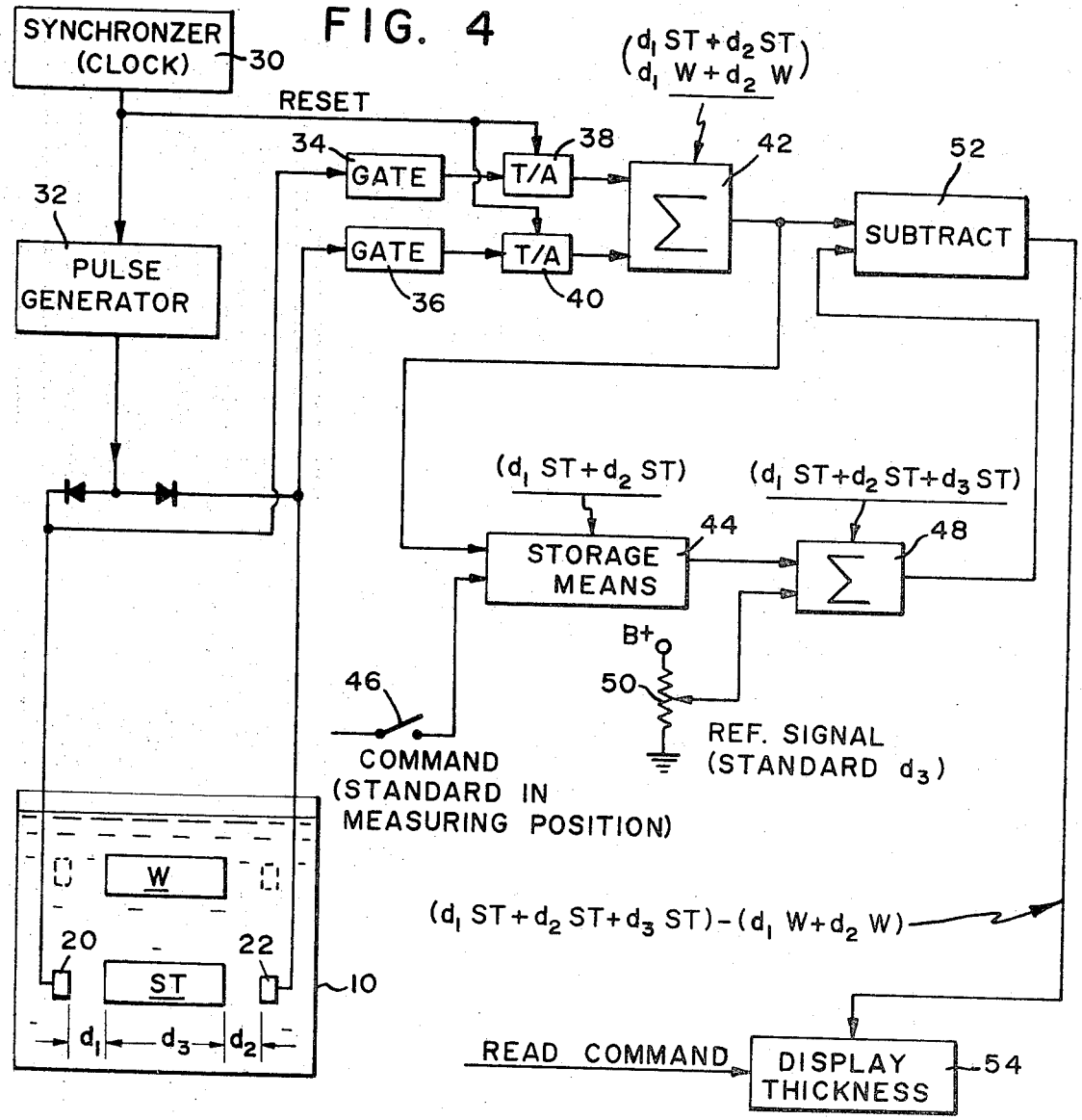
FIG. 4 is a schematic electrical circuit diagram of the present invention.
Figure 5:
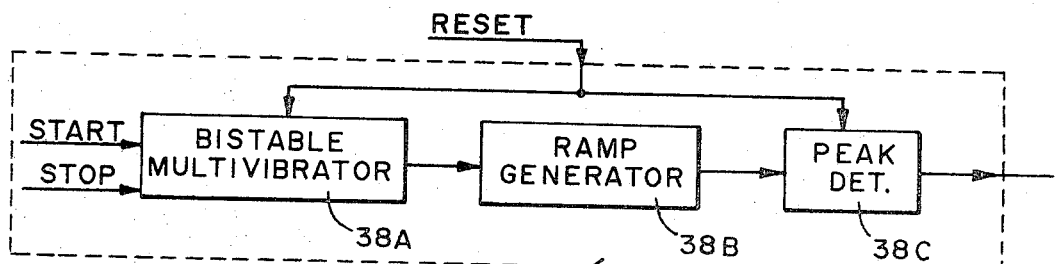
FIG. 5 is another schematic electrical circuit diagram of a certain portion of FIG. 4.

Referring now to FIGS. 4 and 5, a synchronizer or clock circuit cyclically energizes a pulse generator means 32 to cause the transducers 20 and 22 to send ultrasonic search pulses through the liquid coupling means toward the surfaces of the standard or workpiece, depending on the position of the frame 24 and transducers 20 and 22. As stated heretofore, during a first period the transducers are disposed for testing the standard ST.

The search signal and the search signal responsive echo signals are received respectively by time delay gate means 34 and 36, one gate means being associated with each transducer and provided to exclude unwanted and spurious signals. A time-analog conversion unit 38, 40 is coupled in series with each gate means for providing a signal whose amplitude is responsive to the time interval between the sending of a search signal by the respective transducer and the subsequent receipt of the echo signal caused by the search signal being reflected at the end surface of the standard, that is, at the interface between the standard and the liquid. A summing means 42 is coupled to the time-analog conversion units and provides the sum of the two signals. As the signals are continued in a cyclic manner, the summing means 42 provides an average of the summed signals.

During the time interval the standard ST is in the position for measurement, the summing means 42 provides a signal which is responsive to the averaged sum of $$d_1ST + d_2ST$$

wherein $d_1ST$ is the distance of the transducer 20 from the end surface of the standard, and $d_2ST$ is the distance of the transducer 22 from the end surface of the standard. During the succeeding interval when the workpiece W is interposed between the transducers, the summed signal corresponds to the value of $d_1W + d_2W$ wherein $d_1W$ and $d_2W$ are the distances of the transducers 20 and 22 from the workpiece, see FIG. 4.

A storage circuit 44, also known as sample-hold circuit, is coupled to receive the summed signals but the circuit 44 is energized by a command-store signal only when the standard is being tested and the command signal is given via the switch 46 near the end of the first time interval. The switch is operated by timing means (not shown) coupled to the motive means controlling the pivotal motion of the frame 24. Therefore, when actuated the storage means 44 stores a signal commensurate with the averaged value of $d_1ST + d_2ST$.

A further summing means 48 is provided and coupled to the storage means 44 and also to a source of electrical potential 50, the latter being adjusted to provide a signal corresponding to the transit time of sound through the standard ST, in other words, commensurate with the length $d_3ST$ of the standard ST. The output signal provided by the summing means 48, therefore, is commensurate with the value of $(d_1ST + d_2ST + d_3ST)$.

The latter output signal is fed to a subtraction circuit 52 which during the second time interval, the workpiece W being interposed between the transducers 20 and 22, provides a signal commensurate with the value of $d_1W$ plus $d_2W$. The output from the subtraction circuit 52, therefore, is a signal commensurate with the value of $(d_1ST + d_2ST + d_3ST) - (d_1W + d_2W)$, which is a value commensurate with the thickness of the workpiece $(d_3W)$ under test. A read-out means or display circuit, calibrated in distance, inch or centimeter, is used to display the final signal. A "read-command" signal is provided so that the display circuit is actuated during the second time interval when the workpiece is under test. If the display circuit is actuated during the first time interval, the standard being tested, the display circuit indicates a value commensurate with the thickness of the standard. This latter test procedure may be used for checking purposes, that is, for calibration and cyclically checking the operativeness of the apparatus.

By virtue of the two step method changes in the transmission velocity of sound within the liquid path are excluded from measurement. As stated before, the liquid is subject to large changes in acoustic sound transmission due to temperature change and particle contamination. In order to enhance the accuracy of the test procedure, the length $d_3$ of the standard should substantially equal the nominal dimension $d_3$ of the workpiece. Changes in temperature difference between the workpiece and standard can then readily be neglected inasmuch as any error caused by a difference in sound velocity within two metal blocks of the same material and same length is insignificant when related to the sound velocity in the liquid path.

FIG. 5 is a typical time-analog circuit and comprises a timing bistable multivibrator or flip-flop circuit 38A, a ramp generator 38B and a peak detector circuit 38C. The multivibrator receives via the gate a start signal responsive to the sending of a search signal by the transducer and a stop signal responsive to the receipt of an echo signal by the same transducer. The multivibrator and the peak detector cyclically receive a reset or clearing signal immediately before a new start signal is received. The reset signal, as shown, is provided by the synchronizer means 30.

In a typical embodiment the storage means is a gated operational amplifier made by Philbrick-Nexus No. 4850 (Philbrick Researches, Inc., Dedham, Mass.), the summing means and subtracting means are available as part No. AD 1115 B from Analog Devices of Cambridge, Mass., U.S.A.

The pulse generator means 32 while shown as a single block may comprise two individual generators, one associated with each respective transducer. Specific attention is called to the feature that the dimensions $d_1$ and $d_2$ may differ since both are determined and only the sum thereof is used for calculation. Therefore, the workpiece does not need to be centered. Finally, since in each cycle both the standard ST and a workpiece W are subjected to test, any change of sound transmission in the liquid is immediately reflected in both time intervals with equal effect and, therefore, the apparatus remains completely self-calibrated despite changing conditions.

What is claimed is:

1. Apparatus for measuring the thickness of a workpiece immersed in a liquid by the ultrasonic pulse-echo method comprising:

a body of liquid;

a pair of transducers disposed in said liquid and spaced a fixed distance from one another;

means for causing during a first time interval a standard and during a second time interval a workpiece to be interposed between said transducers, and said transducers being arranged to be acoustically coupled through said liquid to opposite sides of the standard or workpiece respectively;

electrical pulsing means coupled to said transducers for periodically causing each of said transducers to send ultrasonic search signals through said liquid to the standard during the first time interval and to the workpiece during the second time interval, and said transducers receiving echo signals responsive to the reflection of the search signals at the respective sides of said interposed standard or workpiece respectively;

signal receiving means associated with said pair of transducers and adapted to provide responsive to the periodic sending of said respective search signals and subsequent receipt of echo signals corresponding pairs of electrical signals, each such signal being commensurate with the transit time of a search signal from a respective transducer to a respective side;

a first summing means coupled to said signal receiving means for summing each received pair of signals and providing a first output signal responsive to the value of the summed signals;

a storage means coupled to said first summing means for receiving said first output signal and actuated during the first time interval for storing a signal responsive to the signals summed by said first summing means;

a reference means for providing a reference signal commensurate with the thickness of the standard; a second summing means coupled to said storage means for receiving said stored signal and also coupled to said reference means for receiving said reference signal, and for providing a second output signal responsive to the summation of the received signals;

a subtraction circuit coupled to said second summing means and to said first summing means for receiving therefrom said second output signal and a first output signal provided by said first summing means during the second time interval, and for producing a third output signal which is the subtraction of the signals received, and readout means to provide an indication of workpiece thickness coupled for receiving said third output signal.

2. Apparatus as set forth in claim 1, said signal receiving means comprising a time to voltage signal conversion means coupled to each of said transducers, said conversion means providing a voltage signal whose amplitude is commensurate with the transit time of the search signal from a respective transducer to a respective side.

3. Apparatus as set forth in claim 1, said body of liquid being confined in a tank having means for supporting the standard and the workpiece.

4. Apparatus as set forth in claim 3, said body of liquid being water.

5. Apparatus as set forth in claim 1, said first and said second time interval being successive intervals separated by a time interval during which relative motion between said transducers and standard and workpiece respectively is effected.

6. The method for measuring by the ultrasonic pulse-echo method the thickness of a workpiece comprising the steps of:

disposing a workpiece and a standard in a common liquid bath;

providing a pair of transducers spaced apart by a fixed distance in said bath and causing selectively the standard or the workpiece to be interposed between said transducers;

disposing during a first time interval the standard between said transducers and periodically energizing said transducers with pulses of electrical energy for causing each of said transducers to send periodically an ultrasonic search pulse toward the standard and receiving echo signals therefrom, the time lapse between the sending of a search pulse and the receipt of a respective echo signal being commensurate with the distance of the respective transducer from the standard;

converting the lapse of time as sensed by each of said transducers to an electrical signal whereby to obtain periodically two electrical signals;

summing and averaging said periodically obtained signals to produce a summed signal;

adding to said summed signal a third signal corresponding to the transit time of sound through the standard to provide a first output signal;

disposing during a second time interval a workpiece between said transducers and periodically energizing said transducers with pulses of electrical energy for causing each of said transducers to send periodically an ultrasonic search pulse toward the workpiece and receiving echo signals therefrom, the time lapse between the sending of a search pulse and the subsequent receipt of a respective echo signal being commensurate with the distance of the respective transducer from the workpiece;

converting the lapse of time as sensed by each of said transducers during said second time interval to an electrical signal whereby to obtain two electrical signals related to the workpiece;

summing and averaging said last stated signals to provide a second output signal;

subtracting said second output signal from said first output signal whereby to obtain a difference signal commensurate with the dimension of the workpiece, and displaying a value responsive to said difference signal.

7. The method as set forth in claim 6 and including the step of storing said summed and averaged signal obtained during said first time interval for use during said second time interval.

References Cited

UNITED STATES PATENTS

| | | | |
|---|---|---|---|
| 3,060,421 | 10/1962 | Rideout | 73—67.7X |
| 3,115,615 | 12/1963 | Saper | 340—3 |
| 3,117,276 | 1/1964 | Beyer et al. | 73—67.7X |

JAMES J. GILL, Primary Examiner

A. E. KORKOSZ, Assistant Examiner

U.S. Cl. X.R.

340—3

PO-1050
(5/69)

UNITED STATES PATENT OFFICE
CERTIFICATE OF CORRECTION

Patent No. 3,554,014                Dated  January 12, 1971

Inventor(s)  Jerry Berg and Lawrence E. Bauer, Jr.

It is certified that error appears in the above-identified patent and that said Letters Patent are hereby corrected as shown below:

Title:  After "LIQUID" insert -- INCLUDING --;

ABSTRACT OF THE DISCLOSURE:  line 6, after "standard" insert -- and --;

Column 2, line 45, after "as" insert -- a --;

Signed and sealed this 23rd day of March 1971.

(SEAL)
Attest:

EDWARD M. FLETCHER, JR.              WILLIAM E. SCHUYLER, JR.
Attesting Officer                    Commissioner of Patents